Figure 6:
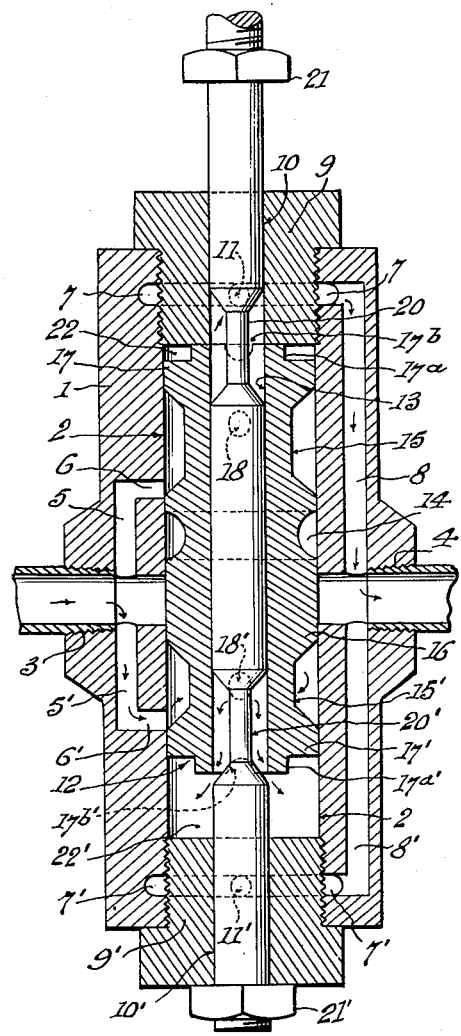

Oct. 20, 1964 E. C. SEWARD 3,153,528
SPOOL TYPE CONTROL VALVE
Filed Sept. 6, 1961 2 Sheets-Sheet 1
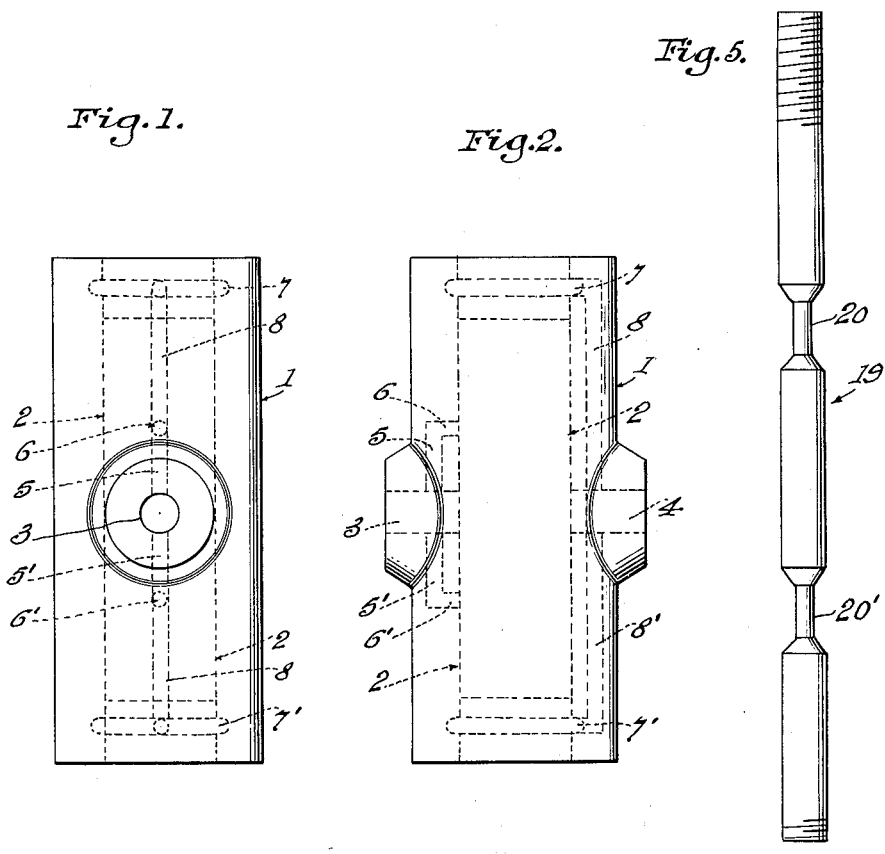
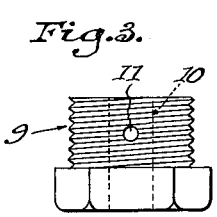
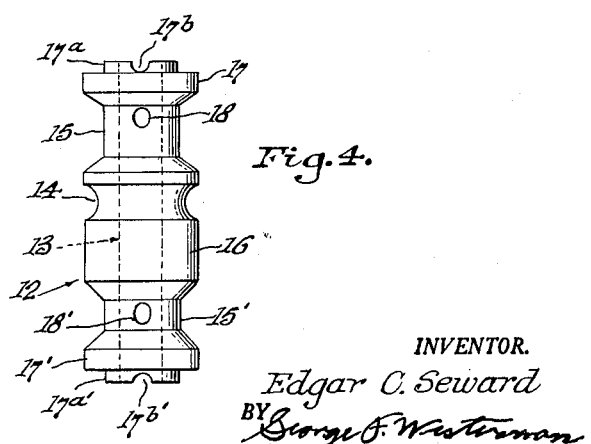
INVENTOR.
Edgar C. Seward
BY
ATTORNEYS Oct. 20, 1964   E. C. SEWARD   3,153,528
SPOOL TYPE CONTROL VALVE
Filed Sept. 6, 1961   2 Sheets-Sheet 2

INVENTOR.
Edgar C. Seward
BY George F. Westerman
Bonifield Hamilton
ATTORNEYS

United States Patent Office 3,153,528
Patented Oct. 20, 1964

3,153,528
SPOOL TYPE CONTROL VALVE
Edgar C. Seward, 2008 S. Randolph St., Arlington, Va.
Filed Sept. 6, 1961, Ser. No. 136,373
3 Claims. (Cl. 251—31)
(Granted under Title 35, U.S. Code (1952), sec. 266)

The invention described herein may be manufactured and used by or for the Government for governmental purposes without the payment of any royalty thereon.

The present invention relates to the field of control valves, more particularly to spool type control valves designed to operate over broad ranges of pressure although actuated by relatively small forces.

There are many applications calling for control valves capable of responding to relatively small external forces. For example, an automatic shutoff valve which maintains the liquid level in a tank or reservoir frequently must respond to the small force exerted by a float. Float actuated valves and other valves operated by minimal forces are unreliable when they are called on to control the flow of high pressure fluid. The pressure of such fluid exerted against the face of a closed valve is likely to keep it in a closed position. Similarly, the flow of high pressure fluid is likely to prevent the closing of a control valve when the external actuating force is small.

The principal object of this invention is to provide a spool type control valve operable between open and closed positions by a relatively small external force.

Another object of this invention is to provide a valve which can be used to control the flow of fluid over a broad range of pressures.

Briefly the invention comprises a valve body having inlet and outlet ports opening into an inner cavity; a secondary valve slidably received within this cavity and movable between one position in which it blocks the inlet from the outlet port and a second position in which it permits fluid to pass from the inlet to the outlet port; and a primary valve which is itself slidably received within the secondary valve. The primary valve is connected to the external actuating force. The components of the valve mechanism are so made and have ports and passages so located that when the primary valve is actuated, fluid from the inlet side of the valve body flows to the pressure chamber formed between one end of the secondary valve and the inner cavity of the valve body and completes the operation (either opening or closing) initiated by the primary valve. Means are provided for simultaneously venting fluid from the similar pressure chamber at the other end of the secondary valve.

In the drawings which show the invention in its preferred form:

FIG. 1 in a front elevation of the valve body;
FIG. 2 is a side elevation of the valve body;
FIG. 3 is a side elevation of one end plug;
FIG. 4 is a side elevation of the secondary valve;
FIG. 5 shows the primary valve in elevation;
FIG. 6 is a side elevation of the entire valve assembly, partly in section, illustrating the positions of the primary and secondary valves when the valve is completely closed; and
FIG. 7 is a side elevation of the entire valve assembly, partly in section, illustrating the positions of the primary and secondary valves when the valve is completely opened.

Referring now to FIGS. 1 and 2, the valve body 1 comprises a metal cylinder having an axial bore 2. An inlet port 3 and an outlet port 4 communicate with the axial bore and are each provided with suitable fittings (not shown) for connection to the service lines. Passages 5 and 5' leading from the inlet port 3 and terminating in pressure ports 6 and 6' are provided and annular grooves 7 and 7' are made in the axial bore of the valve body close to each end. Venting passages 8 and 8' connect each of these annular grooves with the outlet 4.

Referring to FIG. 3, end plug 9 has an axial bore 10 and a venting port 11 so located that it connects the said axial bore and annular groove 7 when the end plug is inserted in the valve body. The end plug and the axial bore of the valve body may be threaded for securing the end plug to the valve body.

Figure 7:
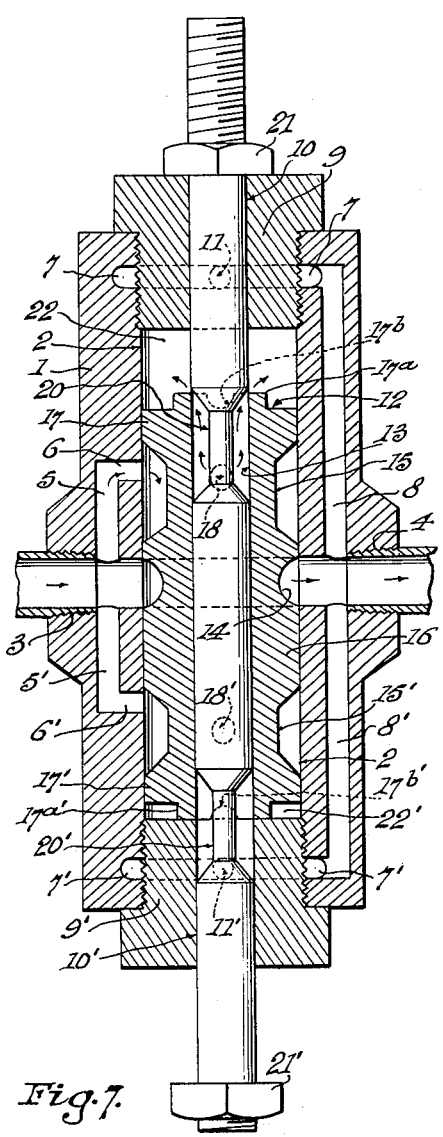

End plug 9' which appears in FIGS. 6 and 7, having axial bore 10' and venting port 11', is identical in construction to end plug 9. When the end plugs and the valve body are assembled they form an inner cavity within the valve body. Of course the valve body and end plugs might be manufactured as an integral unit.

The secondary valve (see FIG. 4) comprises a metal cylinder whose greatest diameter is such that the secondary valve 12 will make a close slidable fit when placed in the inner cavity of the valve body. The secondary valve has an axial bore 13, a central recessed zone 14 and two outer recessed zones 15 and 15'. Recessed zones 14 and 15' are so spaced that the central land 16 remaining between them is wider than the diameter of the inlet port 3 and so can completely block it when positioned opposite it. At the ends 17 and 17' of the secondary valve, collars 17a and 17a' surround its axial bore except where grooves 17b and 17b' are cut into the collars.

The primary valve 19 (see FIG. 5) comprises a metal rod, circular in cross-section, whose outside diameter is such that the rod will make a close slidable fit with the axial bore of the secondary valve and the end plugs. Spaced apart recessed zones 20 and 20' are cut in the primary valve. The size and location of these recessed zones will be clarified in the description which follows.

Referring now to FIGS. 6 and 7 for an explanation of how the valve is assembled and how it operates, nuts 21 and 21' limit the travel of the primary valve when it is actuated by the external force. The connection to the external actuating means is not shown in any of the drawings. The travel of the secondary valve is limited by the inner faces of end plugs 9 and 9'.

Let us assume that the valve is closed, as in FIG. 6, and that the external force actuates the primary valve for the purpose of opening the entire valve. First the primary valve moves downward to the position shown in FIG. 7, the secondary valve may lag behind and remain in the position it occupies in FIG. 6. However, recessed zone 20 in the primary valve has moved to a position where it is opposite port 18 of the secondary valve, thus providing a channel through which fluid may flow from inlet port 3 to pressure chamber 22 formed by end 17 of the secondary valve, end plug 9, and the walls of axial bore 2. This channel is along passage 5, through port 6, into the space between recessed zone 15 and axial bore 2, through port 18, into the space between recessed zone 20 and axial bore 13 of the secondary valve, thence to pressure chamber 22. Fluid in this chamber having substantially the same pressure as the fluid at the inlet port pushes the secondary valve down into the position shown in FIG. 7, aligning recessed zone 14 with inlet port 3 and outlet port 4. Fluid is then free to flow from the inlet port around recessed zone 14 to the outlet port. The pressure in chamber 22 thereafter maintains the valve in its open position.

Either before or while the secondary valve is traveling from its closed to its open position, it is necessary that chamber 22', formed between end 17' of the secondary valve, end plug 9' and the walls of axial bore 2 be vented, in other words, that fluid in pressure chamber 22' be discharged. Venting starts when the primary valve moves to its downward position shown in FIG. 7. When this occurs, recessed zone 20' of the primary valve is aligned with annular groove 7' in end plug 9'. A channel is then opened for the fluid in chamber 22' to flow between recessed zone 20' and axial bore 10' of the end plug through port 11' into annular groove 7' thence through passage 8' to outlet port 4. The fluid in chamber 22' is forced out the venting channel just described by the downward motion of the secondary valve.

Closing of the valve from the open position shown in FIG. 7 to the closed position shown in FIG. 6 is analogous to the opening operation just described. First the primary valve actuated by the external force moves to the upward position it occupies in FIG. 6. A channel is then opened for fluid under pressure to travel from the inlet through the valve body to pressure chamber 22'. The channel is through passage 5', port 6', port 13', thence through the space between recessed zone 20' and axial bore 13 to chamber 22'. At the same time, the venting channel is opened from pressure chamber 22 to the outlet port. This channel is from chamber 22, through the space between axial bore 10 and recessed zone 20 to port 11, thence through annular groove 7 and passage 8 to outlet port 4. When the secondary valve is forced upward to the closed position shown in FIG. 6 by pressure in chamber 22', it drives the fluid from chamber 22 through the venting channel just described. The pressure in chamber 22' thereafter maintains the valve in its closed position.

Many obvious changes and modifications in design may be made in the spool type control valve and it may be used for many purposes besides those enumerated without departing from the principle of the invention.

I claim:

1. A spool type control valve mechanism for alternatively permitting and interrupting the flow of fluid in a conduit comprising a valve body having an inner cavity and a single inlet port and a single output port communicating therewith; a secondary spool element of lesser length than the said inner cavity, having a bore, opening means for connecting the inlet port to the outlet port, and closing means within said valve body and carried by said secondary spool element for blocking the inlet port from the outlet port so that no fluid enters or leaves the valve, slidably received in the aforesaid inner cavity and defining in conjunction with the inner cavity, pressure chambers at each end of the secondary valve; channels for delivering fluid under pressure to each of the said pressure chambers and channels communicating with said single outlet for venting fluid from each of the said pressure chambers; a primary spool element slidably received in said bore of said secondary spool element having control means which permits fluid under pressure to flow into one pressure chamber while simultaneously permitting fluid to vent from the other pressure chamber, thereby causing the secondary spool element to slide to a position for selectively aligning the opening means and closing means of the secondary spool element with the inlet and outlet ports of the valve body.

2. A spool type control valve mechanism for alternatively permitting and interrupting the flow of fluid in a conduit comprising a valve body having an axial bore and a single inlet and a single outlet port communicating therewith; a secondary valve having end surfaces thereon, slidably received in the bore of the valve body, having two outer recessed zones, a central recessed zone for permitting the flow of fluid from the inlet to the outlet port, a central land zone for cutting off the flow of fluid from the inlet to the outlet port, a bore, and ports in each of the outer recessed zones communicating with the said valve body bore and the said secondary valve bore, the secondary valve being slidable between an open position in which the central recessed zone is aligned with the inlet and outlet ports and a closed position in which the central land zone is aligned with the inlet and outlet ports; a primary valve slidably received in the bore of the secondary valve, having a first and a second recessed zone, each of said zones having an axial length greater than the distance between said secondary valve outer recessed zone ports and their respective nearest valve end surfaces; end plugs at the extremities of the axial bore of the valve body, each end plug having a bore in which the primary valve is slidably received, and each end plug in conjunction with the end of the secondary value nearest said plug and the walls of the valve body's bore forming a pressure chamber; means for admitting pressure fluid from the inlet side of the valve to the outer recessed zones of the secondary valve; venting means for discharging fluid from each of the aforesaid pressure chambers; whereby when the primary valve is made to slide within the secondary valve by an external actuating force, the first recessed zone of the primary valve opens a channel between the ports of the adjacent outer recessed zone of the secondary valve and the adjacent pressure chamber admitting fluid under pressure into said chamber and the secondary recessed zone of the primary valve opens a channel between the other pressure chamber and its venting means thus causing the secondary valve to slide to the open position; and whereby when the primary valve is made to slide in the opposite direction within the secondary valve by an external actuating force, the second recessed zone of the primary valve opens a channel between the ports of the adjacent outer recessed zone and the adjacent pressure chamber admitting fluid under pressure into said chamber and the first recessed zone opens a channel between the other pressure chamber and its venting means, thus causing the secondary valve to slide to the closed position.

3. A spool type control valve mechanism as described in claim 2 wherein the means for admitting pressure fluid from the inlet side of the valve to the outer recessed zones includes a pair of passages formed within the wall of the valve body and extending in opposite directions from the inlet port; and wherein the venting means includes an annular groove formed in the axial bore of the valve body adjacent the side of each end plug, passages formed within said valve body communicating between each of said annular grooves and the outlet port, and a venting port in each end plug communicating between the adjacent annular groove and the axial bore of said end plug.

References Cited in the file of this patent
UNITED STATES PATENTS

| | | |
|---|---|---|
| 151,667 | Loretz | June 2, 1874 |
| 1,125,825 | Englesson | Jan. 19, 1915 |
| 2,016,878 | Vickers | Oct. 8, 1935 |